United States Patent [19]

Koch

[11] 4,425,824

[45] Jan. 17, 1984

[54] VARIABLE TORQUE BICYCLE SPROCKET

[76] Inventor: Curtis J. Koch, 1142 Scott, Waterloo, Iowa 50701

[21] Appl. No.: 282,113

[22] Filed: Jul. 10, 1981

[51] Int. Cl.³ .......................... F16H 3/44; G05G 1/14
[52] U.S. Cl. .................................... 74/750 B; 74/594.2
[58] Field of Search ................... 74/594.2, 750 B, 437, 74/393

[56] References Cited

U.S. PATENT DOCUMENTS

| 4,193,324 | 3/1980 | Marc | 74/437 |
| 4,261,223 | 4/1981 | Johnson | 74/594.2 |
| 4,309,043 | 1/1982 | Brown | 74/594.2 |

FOREIGN PATENT DOCUMENTS

| 1093562 | 5/1955 | France | 74/594.2 |
| 205284 | 9/1939 | Switzerland | 74/437 |

OTHER PUBLICATIONS

Advertising brochure of Facet Cycle, Inc., Box 50129, Tulsa, Ok. 74150.

*Primary Examiner*—Allan D. Herrmann
*Assistant Examiner*—D. Wright
*Attorney, Agent, or Firm*—Allan L. Harms

[57] ABSTRACT

A bicycle drive sprocket apparatus which allows for varying torque transmission during its rotation and for varying angular velocity of said sprocket when constant rotational force is applied thereto. The device provides for accelerating and decelerating angular velocity during predetermined sectors of the rotational cycle. Through elliptical and other non-uniform radius gear parts, said apparatus converts varying torque inputs into constant torque output. Used as an improved front sprocket for a bicycle, it provides increased resistance to the operator of said bicycle during the downward stroke of the pedal and relatively less resistance during the horizontal portion of the pedal cycle.

5 Claims, 7 Drawing Figures

VARIABLE TORQUE BICYCLE SPROCKET

SUMMARY OF THE INVENTION

The present invention relates to a drive mechanism for a pedalled vehicle. The drive mechanism disclosed has a pair of drive sprockets, one of which selectively engages a driven chain at any given time, depending upon the gear ratio chosen by the person pedalling the vehicle. The pair of drive sprockets is fixed rotationally to one another and to a circular bearing enclosure. Also fixed to said pair of drive sprockets is a pinion enclosure. Bearings selectively engage said bearing enclosure to a channeled disk to which is attached a spoke wheel with associated crank arm. The pinion teeth of the pinion enclosure are engaged by the teeth of a circular control gear. The axle of the control gear engages said control gear through key means and also engages a movable non-circular gear through key means, thereby locking the rotation of the control gear to that of the movable non-circular gear. The movable non-circular gear engages an endless chain which also engages a stationary non-circular gear of shape and size similar to that of the movable non-circular gear. The stationary non-circular gear is fixed to the frame of the vehicle being driven and positioned so that the shorter axis is approximately coincident with the expected direction of leg extension force of the pedaller. A second crank arm is attached to the main axle which passes through the frame of the vehicle, through the axis of the stationary non-circular gear and is attached to the spoke wheel. The second crank arm is positioned in said main axle so that it is rotationally 180 degrees from the crank arm which is part of the spoke wheel. Pedals are mounted to each crank arm.

In an alternative embodiment, a sprocket which engages a driven chain includes a pinion enclosure. The pinion teeth of the pinion enclosure engage a control gear, the axle of which is fixed to said control gear and passes through an arm which extends radially from the main axle of the apparatus. The control gear axle also engages a movable non-circular gear and is affixed in rotative position thereto by key means. The control gear axle freely moves with the aperture of the arm through which it passes. One end of the main axle of the apparatus protrudes through a bearing axially located in a stationary non-circular gear and then through the vehicle frame and has a second pedal crank fixed thereto. The other end of said axle extends through a bearing within said sprocket member and terminates with a first pedal crank in diametrically opposed position to the other pedal crank. A chain engages both non-circular gears. The stationary non-circular gear is fixed to the vehicle frame such that its longer axis is perpendicular to the direction of force of leg extension of the pedaller. In either embodiment summarized above, when force in the direction of leg extension is imparted to one pedal, relatively more resistance is presented to the force imparted while when the non-extending components of pedalling activity are engaged in, relatively less resistance is encountered by the pedaller.

One object of the invention is to provide a gear which requires varying rotational torque application to drive the circumference thereof with a constant load thereon.

Another object of the invention is to provide a gear which when driven through its axis by a constant force provides varying angular velocity of the outer circumference therein.

Another object of the invention is to provide a bicycle front gear sprocket which presents a heavier drive load for the bicycle operator during the vertical portion of the pedal stroke in comparison to the horizontal portion of the pedal stroke.

Another object of the invention is to provide a variable load front bicycle sprocket without chain storage problems.

Another object of the invention is to provide a variable load front bicycle sprocket which allows gear changing as is commonly utilized in multi-speed touring bicycles.

Another object of the invention is to provide a variable load front bicycle sprocket which is capable of being operated with a rear derailleur gear system. Another object of the invention is to provide a variable load front bicycle gear which may be easily installed by direct substitution for existing front sprockets on assembly line produced bicycles, as well as on custom built bicycles.

Another object of the invention is to provide a sprocket which when driven by a source of constant torque provides an output torque which is inverse to the rotational speed of the source of input torque.

Another object of the invention is to provide a varying sprocket gear which is predictable as to when changes in torque or rotational speed will occur as to time and repetition.

Another object of the invention is to provide a gear which allows for varying speeds of operation at predetermined intervals.

These and other objects will be apparent from the ensuing description.

DETAILED DESCRIPTION OF THE INVENTION

Figure 1:
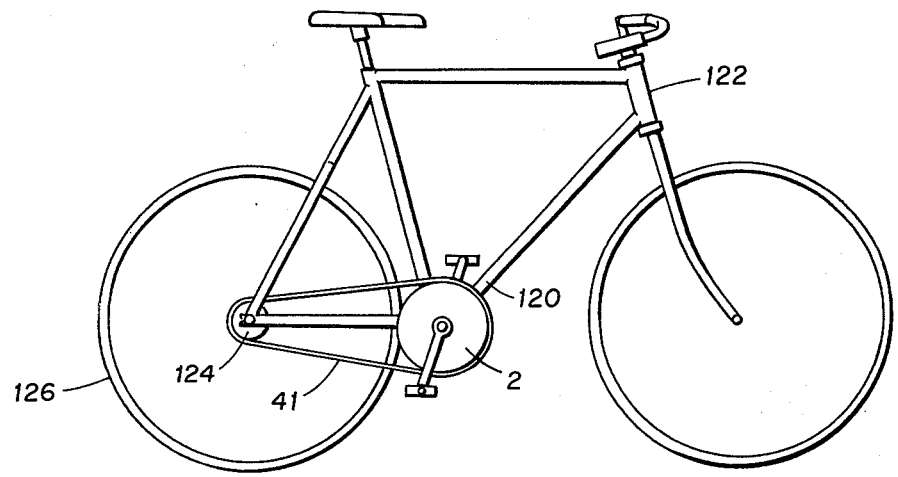
FIG. 1 is a view of the invention installed on a standard bicycle.

FIG. 1 of the drawing shows invention 2 installed on frame 120 of standard bicycle 122. Chain 41 links invention 2 to rear sprocket 124 of rear wheel 126 of bicycle 122.

Figure 2:
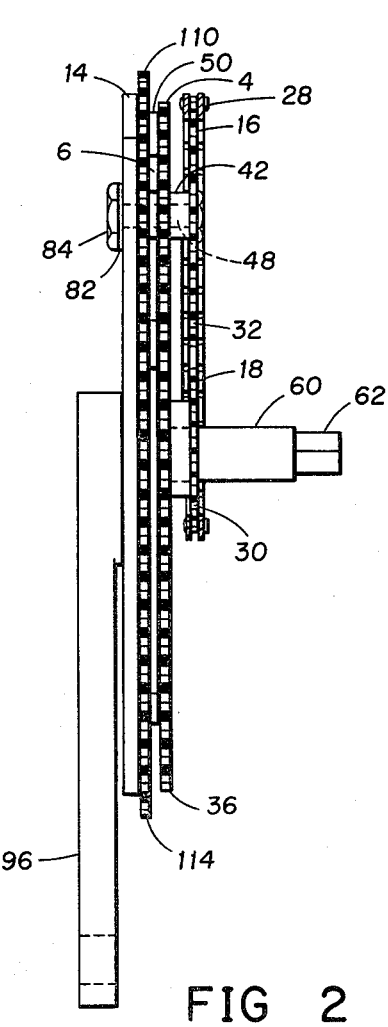
FIG. 2 is an end view of the invention.

FIG. 2 shows an end view of the invention. Movable non-circular gear 16, including bushing 42, is positioned on short axle 48, and is mounted at fixed distant relationship to first drive sprocket 4. Tab 50 of bearing enclosure 6 is between first drive sprocket 4 and second drive sprocket 110. Spoke wheel 14 is positioned in fixed spatial relationship to second drive sprocket 110. Crank arm 96 is fixed to spoke wheel 14. Teeth 36 are located on first drive sprocket 4. Teeth 114 are located on second drive sprocket 110. Teeth 32 are part of movable non-circular gear 16. Teeth 30 are part of stationary non-circular gear 18. Central main axle 60 extends from stationary non-circular gear 18 and terminates in first main axle end 62.

Figures 3, 6:
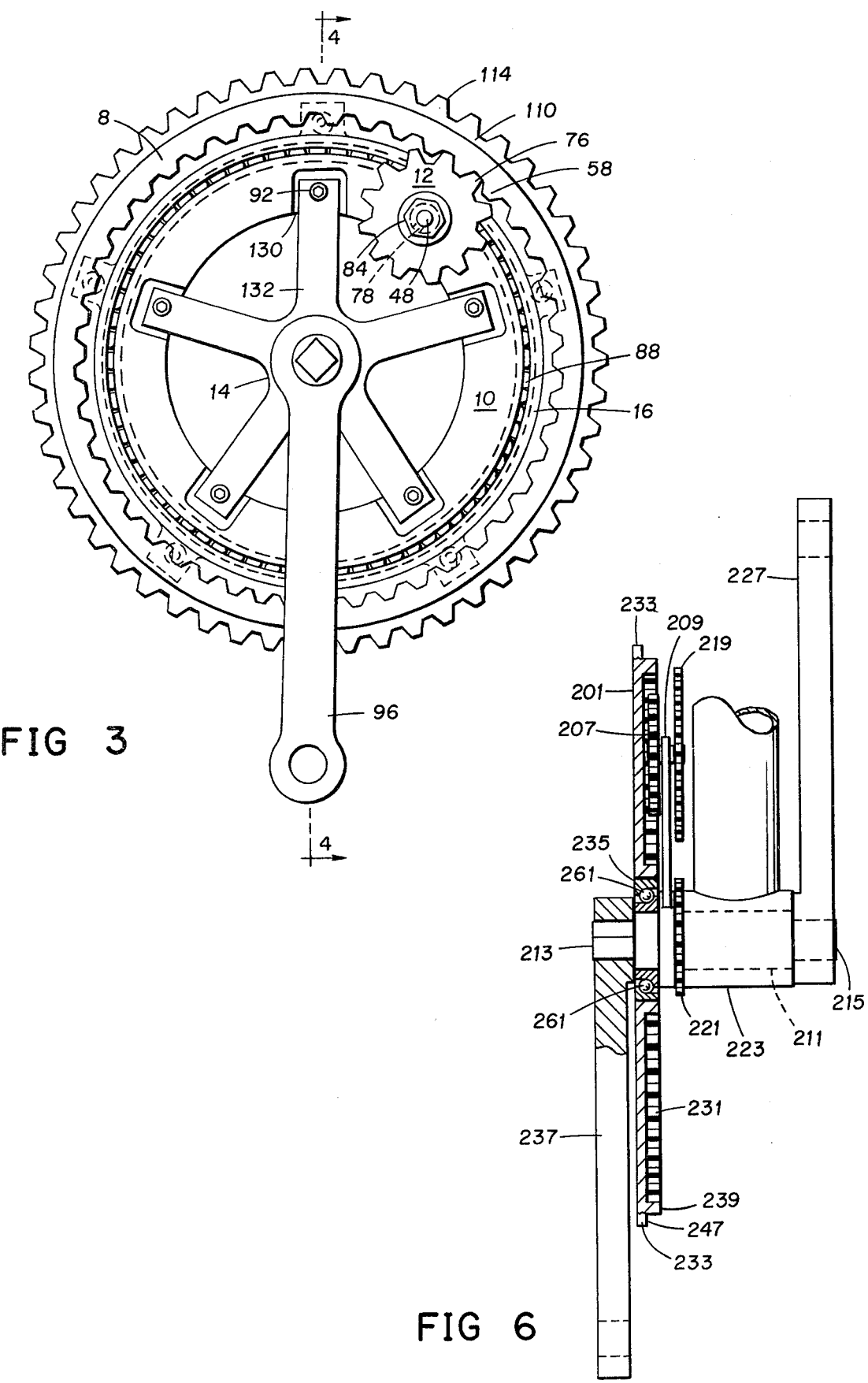
FIG. 3 is a front view of the invention.
FIG. 6 is a view partially in section of an alternative embodiment of the invention.

FIG. 3 shows a side view of the preferred embodiment of the invention. Spokes 132 of spoke wheel 14 are fixed by screws 92 to channeled disk 10 at indentations 130. Crank arm 96 extends from the center of spoke wheel 14 and is permanently attached thereto. Control gear 12 is mounted on short axle 48 and is positioned to rotate in concerted fashion with short axle 48 through the placement of key 78. Control gear teeth 76 of control gear 12 engage pinion enclosure teeth 58 of pinion enclosure 8. Second drive sprocket teeth 114 are located on the outer circumference of second drive sprocket 110.

Figure 4:
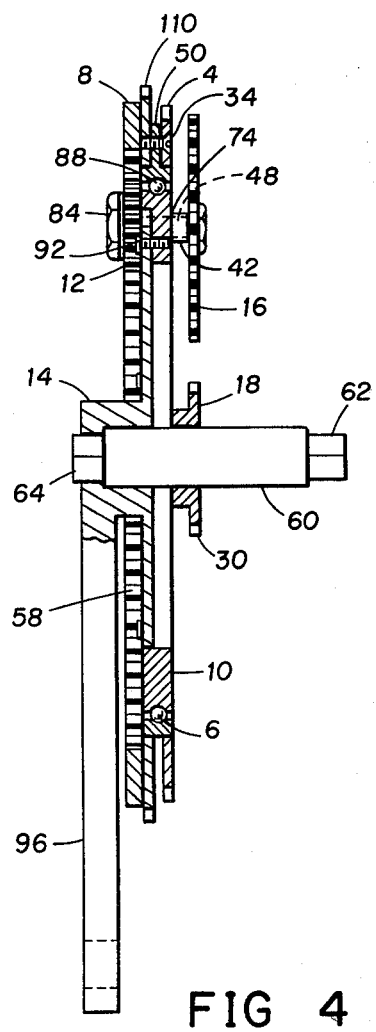
FIG. 4 is a sectional view along 4—4 of FIG. 3.

FIG. 4 shows the invention in section along 4—4 of FIG. 3. Central main axle 60 terminates in first main axle end 62 and second main axle end 64. Second main axle end 64 engages spoke wheel 14. Spoke wheel 14 is mounted to channeled disk 10 by screw 92. Bearings 88 are captured between the outer channeled circumference of channeled disk 10 and the inner channeled surface of bearing enclosure 6. Second drive sprocket 110, mounting tab 50 of bearing enclosure 6, and first drive sprocket 4 are held in fixed relationship by screw 34. Circular control gear 12 engages pinion enclosure teeth 58 of pinion enclosure 8. Movable non-circular gear 16, including fixed bushing 42, is mounted on short axle 48 which extends through axle aperture 74 of channeled disk 10 and circular through control gear 12 and terminates with fastener nut 84. Central main axle 60 passes through stationary non-circular gear 18. Movable non-circular gear 16 and stationary non-circular gear 18 may be elliptical in shape.

Figure 5:
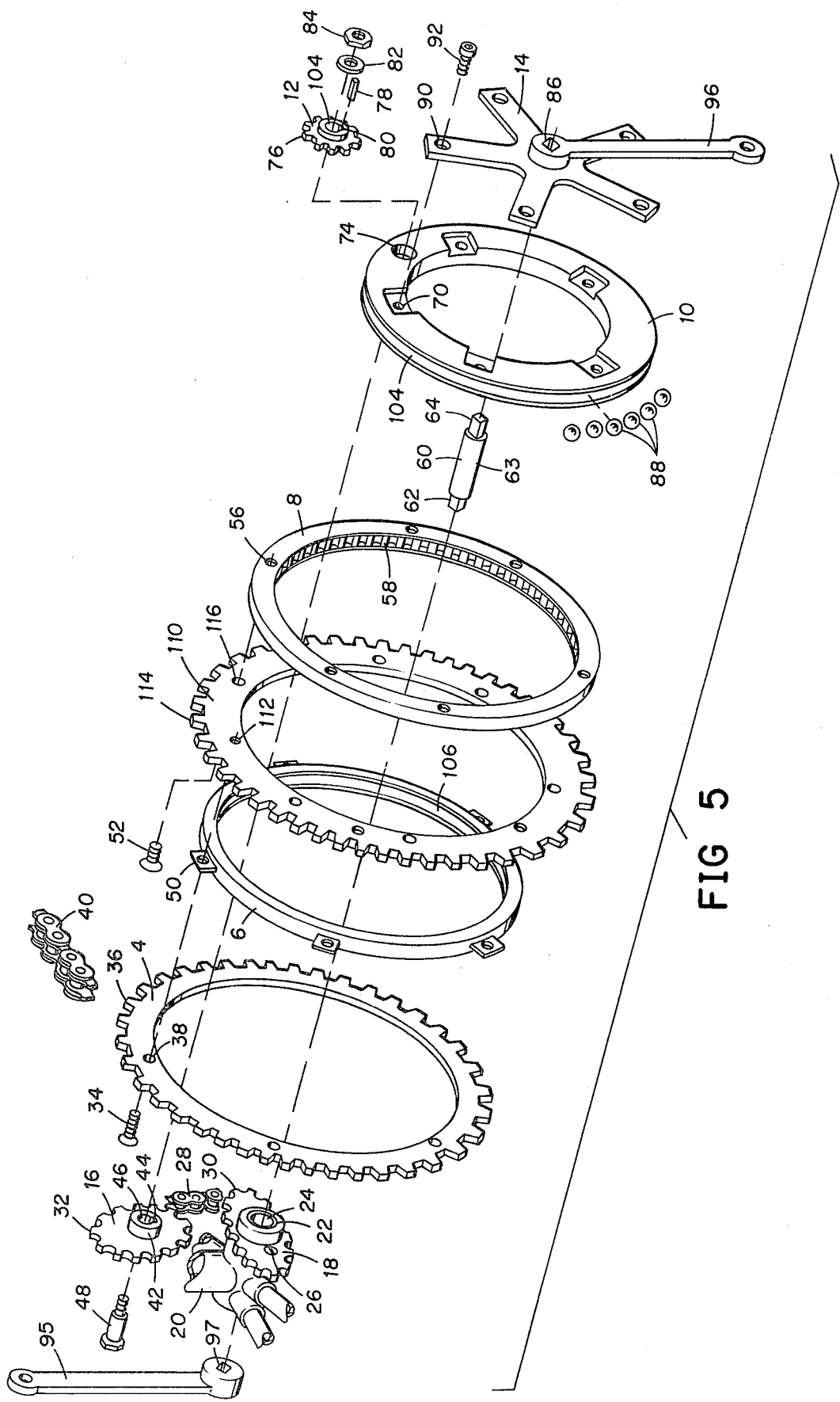
FIG. 5 is an exploded view of the preferred embodiment of the invention.

FIG. 5 shows the invention in exploded view. Stationary non-circular gear 18 is attached by fastening screw 26 to bicycle frame 20. Chain 28 connects teeth 30 of stationary non-circular gear 18 to teeth 32 of movable non-circular gear 16. Short axle 48 passes through aperture 46 in movable non-circular gear 16, through axle aperture 74 of inner channeled disk 10, through aperture 104 of control gear 12 and is fastened with washer 82 and nut 84. Bushing 42 is fixed to movable non-circular gear 16. Key 78 passes through keyway 80 of control gear 12 and through keyway 44 of movable non-circular gear 16 to lock the central rotation of control gear 12 and movable non-circular gear 16 together. Chain 40 interacts selectively with either first drive sprocket teeth 36 of first drive sprocket 4 or with second drive sprocket teeth 114 of second drive sprocket 110, for output from invention 2. Second drive sprocket 110 is fixed to pinion enclosure 8 by screw 52 passing through aperture 116 and engaging threaded opening 56. Bearing enclosure 6 is mounted to first drive sprocket 4 and second drive sprocket 110 by screw 34 passing through opening 38 of first drive sprocket 4 and through tab 50 of bearing enclosure 6 and engaging threaded opening 112 of second drive sprocket 110. Channeled disk 10 engages bearing enclosure 6 in coplanar fashion through bearings 88 retained in the enclosure formed in inner bearing channel 104 circumferentially formed on channeled disk 10 and outer bearing channel 106 circular of bearing enclosure 6. Control gear teeth 76 of control gear 12 engage pinion enclosure teeth 58 of pinion enclosure 8. Spoke wheel 14 is mounted to channeled disk 10 by screw 92 passing through opening 90 and engaging threaded opening 70 of channeled disk 10. Second and 64 of central main axle 60 engages matching opening 86 of spoke wheel 14.

First main axle end 62 of central main axle 60 passes through aperture 24 of bearing 22 of stationary non-circular gear 18 and through bicycle frame 20 and engages matching aperture 97 of crank arm 95. Bearing portion 63 of main axle 60 engages in sliding fashion bearing aperture 24 of bearing 22 and bicycle frame 20.

Figure 7:
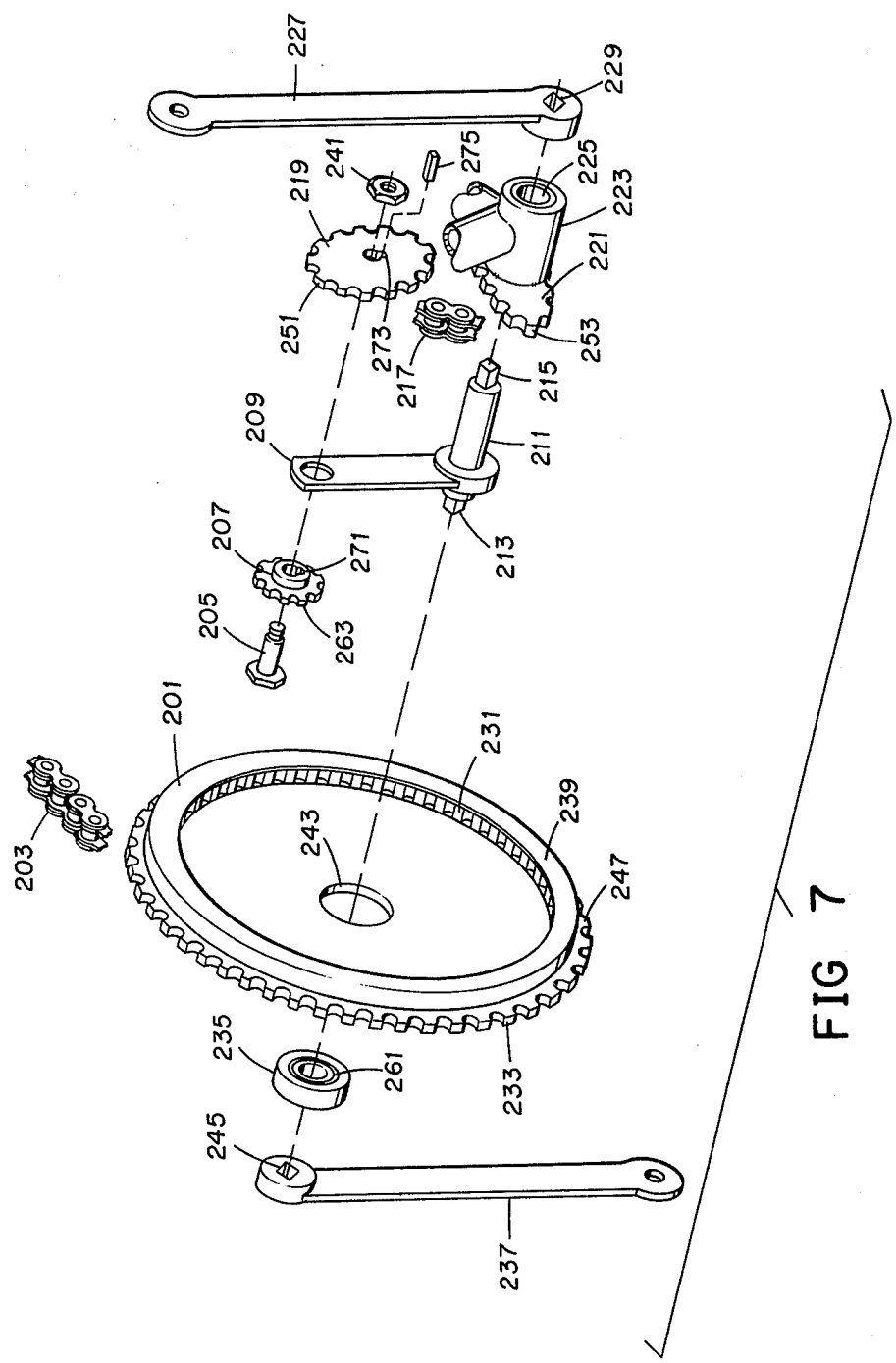
FIG. 7 is an exploded view of an alternative embodiment of the invention.

Referring now to FIGS. 6 and 7, an alternative embodiment of the invention is shown. Sprocket member 201 comprises pinion enclosure 239 and sprocket ring 247. Main drive chain 203 engages teeth 233 of sprocket ring 247. Axle bolt 205 passes through control gear 207, arm 209 and movable non-circular gear 219 and terminates with fastener 241. Key way 271 is formed in control gear 207. Key way 273 is formed in non-circular gear 219. Key 275 is positioned in key way 271 and key way 273. Arm 209 is attached in fixed radiating relationship to main axle 211. Bearing 235 engages main axle 211 internally and engages opening 243 of sprocket member 201 externally. Bearing 235 has a plurality of balls 261 therein. Main axle 211 has first end 213 which engages matching opening 245 of first crank arm 237. Main axle 211 passes through stationary non-circular gear 221 and axle passageway 225 of frame 223. Second end 215 of main axle 211 engages matching opening 229 of second crank arm 227. Main axle 211 may rotate freely within axle passageway 225. Control chain 217 engages teeth 251 and movable non-circular gear 219 and teeth 253 of stationary non-circular gear 221. Stationary non-circular gear 221 is fixed to frame 223. Pinion enclosure teeth 231 of sprocket disk 201 engage teeth 263 of control gear 207.

OPERATION OF THE PREFERRED EMBODIMENT OF THE INVENTION

As movable non-circular gear 16 rotates with channeled disk 10, chain 28 engages and wraps around stationary non-circular gear 18, which is held stationary upon the bicycle frame 20. Since the center of movable non-circular gear 16 is held at a fixed distance from the center of stationary non-circular gear 18, movable non-circular gear 16 rotates at a non-uniform rate. The non-circular shapes of movable non-circular gear 16 and stationary non-circular gear 18 causes the quantity of chain 28 which engages stationary non-circular gear 18 to vary according to the relative position of movable non-circular gear 16 with respect to stationary non-circular gear 18 during rotation. Control gear 12, which due to key means 78 and key means 44 of movable non-circular gear 16, has a uniform central angular velocity equal to that of movable non-circular gear 16, and consequently rotates at varying velocities, causing pinion enclosure 8 and first drive sprocket 4 and second drive sprocket 110 to which it is mounted, to be retarded in rotation with respect to channeled disk 10. The result is that first drive sprocket 4 and second drive sprocket 110 to which it is mounted to be retarded in rotation with respect to channeled disk 10. The result is that first drive sprocket 4 and second drive sprocket 110 accelerate and decelerate as torque is applied to channeled disk 10, resulting in a repetitive cycle of two accelerations and two decelerations during each complete rotation of inner enclosure disk 10. The orientation of stationary non-circular gear 18 controls the portions of the cycle of first drive sprocket 4 and second drive sprocket 110 during which accelerations and decelerations occur.

As a front sprocket for a bicycle, stationary non-circular gear 18 is mounted to the bicycle frame with its longer axis parallel to the plane of the surface upon which the bicycle is to be operated. This orientation, coupled with appropriate orientation of pedal crank arm 95 and spoke wheel 14 causes the rotation of first drive sprocket 4 and second drive sprocket 110 to increase in velocity during the downstroke of the bicycle pedal and to decelerate during the relatively more horizontal portion of the pedal stroke.

Changes in the ratio of the shorter axis of each of movable non-circular gear 16 and stationary non-circular gear 28 to the longer axis thereof affect the ratio of rotation between channeled disk 10 and first drive sprocket 4 and second drive sprocket 110, during each portion of their cycles. Changes in the radius of control gear 12 inversely affect the amount of rotation experienced by channeled disk 10 in effectuating one complete cycle of rotation of outer drive ring 4.

Having thus described the invention, I claim:

1. Apparatus for driving a foot-propelled vehicle comprising
    a pair of non-circular gears interactively connected
    one of said non-circular gears affixed to the frame of the vehicle to be propelled
    the second of said non-circular gears being rotatively coupled to a circular gear,
    the circular gear having teeth thereon,
    a pinion enclosure having pinion teeth therein enclosed,
    said teeth of said circular gear engaging the pinion teeth of said pinion enclosure,
    said second non-circular gear and said circular gear mounted to a first axle,
    said pinion enclosure being fixed to drive sprocket having central axle journalled therethrough,
    said first non-circular gear having opening centrally therein,
    said central axle passing through said opening in said first non-circular gear,
    said axle of said drive sprocket having a crank arm fixed to each end thereof, in diametrically opposing relationships,
    said first axle of said circular gear and said second non-circular gear being maintained at a fixed radius from said central axle of said drive sprocket,
    means for revolving said axle of said circular gear and said second non-circular gear around said central axle such that the angular velocity of rotation of said central axle is identical to the angular velocity of the revolution of said axle of said circular gear and said non-circular gear.

2. The invention of claim 1 wherein said non-circular gears are elliptical.

3. The invention of claim 1 wherein the non-circular gears each have teeth on the outer circumference thereof, an endless drive chain engaging the teeth of each of said non-circular gears.

4. The invention of claim 1 wherein said second non-circular gear and said circular gear being rotationally interconnected by key means.

5. The invention of claim 1 wherein
    said pinion enclosure has a second drive sprocket mounted thereon,
    said second drive sprocket having diameter different from said first drive sprocket.

* * * * *